May 25, 1943.   E. C. HANSEN   2,320,077
ANT POISON CONTAINER
Filed May 25, 1942

INVENTOR:—
ELBIN C. HANSEN.
By Martin P. Smith, ATTY.

UNITED STATES PATENT OFFICE 2,320,077

ANT POISON CONTAINER

Elbin C. Hansen, Los Angeles, Calif.

Application May 25, 1942, Serial No. 444,377

1 Claim. (Cl. 43—131)

My invention relates to an ant poison receptacle of the type shown in United States Letters Patent 1,540,621, issued June 2, 1925, to Mons Hanson and Elben C. Hanson, and the principal objects of my present invention are to generally improve upon the form of ant poison receptacle covered by the aforesaid patent, and to provide a receptacle with means which will provide an effective stop to limit the movement of the cork into the receptacle, and which cork closes the opening through which the liquid poison is introduced into said receptacle.

Further objects of my invention are to provide an improved ant poison receptacle constructed so as to minimize the possibility of moisture, dust and the like from entering the joint between the opening in the top that receives the cork, and further, to construct the inner surface of the side wall of the receptacle so as to enable ants to more readily travel from the poison liquid container in the bottom of the receptacle to the entrance and exit openings for the ants, which openings are located in the upper portions of the side walls of said receptacle.

With the foregoing and other objects in view, my invention consists in certain novel features of construction and arrangement of parts which will be hereinafter more fully described and claimed, and illustrated in the accompanying drawing, in which:

Figure 1:
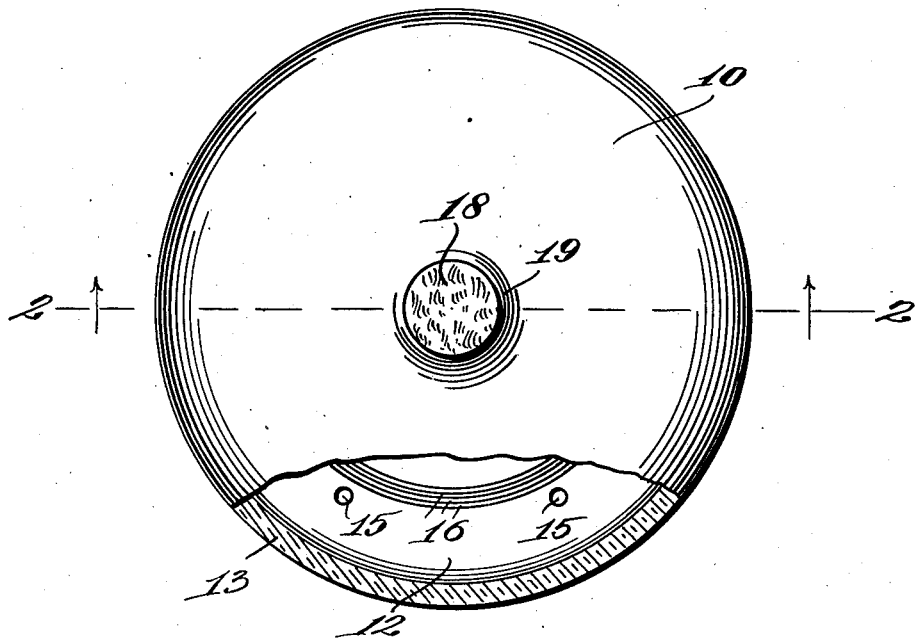
Fig. 1 is a plan view of an ant poison receptacle constructed in accordance with my invention, and with a portion of the upper wall thereof broken away.
Figure 2:
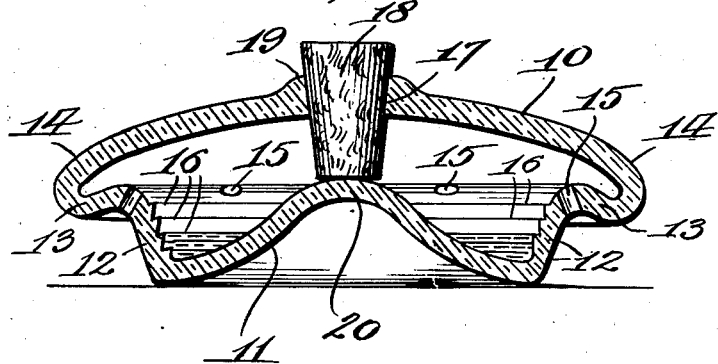
Fig. 2 is a vertical cross section taken on the line 2—2 of Fig. 1.

As illustrated in the accompanying drawing, my improved ant poison receptacle is formed in a single piece from earthenware, such as porcelain, or from glass, and comprises a convex disc shaped top wall 10, a bottom wall 11 which is smaller in diameter than the top wall, and a side wall 12.

The side wall 12 extends upwardly and outwardly from the outer edge of the bottom wall 11 and the upper portion of said side wall is extended outwardly and downwardly for a short distance as designated by 13 to join the downwardly curved marginal portion 14 of the top wall 10.

The outer lower margin of portion 13 provides a drip rib which materially assists in the drainage of rain or water from a hose or sprinkler that may fall on the upper surface of the top wall 10.

Formed through the side wall 12 inwardly from the drip rib, and at the upper end of the portion 12 is a series of spaced apertures 15 which serve as entrance and exit for the ants in their travel into and from the interior of the receptacle.

The inner face of side wall 12 below the apertures 15 is formed with a series of circumferential steps or ledges 16 which are of material assistance in enabling the ants to move to and from the poison liquid contained in the bottom of the receptacle, and particularly when said ants loaded with the liquid are crawling upwardly on the inner surface of the side wall to reach the aperture 15.

Formed in the center of top wall 10 is an aperture 17 through which the poison liquid is delivered to the chamber within the receptacle and which aperture is closed by a cork 18. In order to minimize the possibility of water collecting in the joint between the cork and the surface of the top wall around the opening 17, a rib 19 is formed on top of the wall 10 around the opening therein, the upper surface of which rib is inclined or curved downwardly and outwardly to meet the upper surface of wall 10, thus tending to drain any water that may fall on said rib away from the opening.

The central portion of the bottom wall 11 is extended upwardly as designated by 20 to provide a stop against which the lower length of the cork 18 rests and to achieve the desired results. The cork used for closing the opening 17 should be such as to enable a substantial portion thereof to project above the rib 19 when the lower end of said cork bears on the elevated central portion of bottom plate 11.

As the result of the arrangement just described, it is impossible to force the cork all the way into the receptacle, and a sufficient amount of the cork projects above the rib 19 so as to be readily grasped when the cork is removed for the purpose of servicing and cleaning the receptacle.

Thus, it will be seen that I have provided an ant poison receptacle that is relatively simple in construction, inexpensive of manufacture, and very effective in performing the functions for which it is intended.

It will be understood that minor changes in the size, form and construction of the various parts of my improved ant poison receptacle may be made and substituted for those herein shown and described without departing from the spirit of my invention, the scope of which is set forth in the appended claim.

I claim as my invention:

As a new article of manufacture, an ant poison receptacle formed in a single piece and comprising a convex top wall, a bottom wall and a side wall, the latter being provided in its upper portion with apertures for the ingress and egress of ants, there being an opening formed in the top wall to enable the receptacle to be serviced and internally cleaned, a cork for closing said opening, and the central portion of said bottom wall being extended upwardly to a point slightly above the plane occupied by the upper ends of the apertures in the side wall to provide a stop for limiting the downward movement of the cork in said opening.

ELBIN C. HANSEN.